US008025981B2

(12) United States Patent
Boocock

(10) Patent No.: US 8,025,981 B2
(45) Date of Patent: Sep. 27, 2011

(54) NON-CHROMATE CORROSION INHIBITOR FORMULAS BASED ON PERMANGANATE SODALITE COMPOSITIONS

(75) Inventor: Simon K. Boocock, Liberty Township, OH (US)

(73) Assignee: The Shepherd Color Company, Cincinnati, OH (US)

( * ) Notice: Subject to any disclaimer, the term of this patent is extended or adjusted under 35 U.S.C. 154(b) by 142 days.

(21) Appl. No.: 12/211,459

(22) Filed: Sep. 16, 2008

(65) Prior Publication Data

US 2009/0075113 A1 Mar. 19, 2009

Related U.S. Application Data

(60) Provisional application No. 60/973,237, filed on Sep. 18, 2007.

(51) Int. Cl.
*C01G 45/12* (2006.01)
*B32B 15/04* (2006.01)
*C01B 33/26* (2006.01)

(52) U.S. Cl. ..... 428/639; 428/628; 428/450; 423/328.1; 423/328.2; 423/327.1

(58) Field of Classification Search ........................ None
See application file for complete search history.

(56) References Cited

U.S. PATENT DOCUMENTS

| | | | |
|---|---|---|---|
| 4,774,213 A | 9/1988 | Schneider et al. | |
| 4,843,168 A | 6/1989 | Drezdon et al. | |
| 5,246,899 A | 9/1993 | Bhattacharyya | |
| 5,728,363 A | 3/1998 | Martin et al. | |
| 5,730,951 A | 3/1998 | Martin et al. | |
| 5,939,353 A | 8/1999 | Battacharyya et al. | |
| 6,077,885 A | 6/2000 | Hager et al. | |
| 6,156,696 A | 12/2000 | Albers et al. | |
| 6,221,472 B1 | 4/2001 | Nosu et al. | |
| 6,403,826 B1 | 6/2002 | Braig et al. | |
| 6,479,421 B1 | 11/2002 | Vierheilig | |
| 6,716,370 B2 | 4/2004 | Kendig | |
| 6,929,736 B2 | 8/2005 | Vierheilig | |
| 7,022,302 B2 | 4/2006 | Oza et al. | |
| 7,112,313 B2 | 9/2006 | Vierhilig | |
| 7,135,075 B2 | 11/2006 | Buchheit et al. | |
| 2003/0221590 A1* | 12/2003 | Sturgill et al. | 106/401 |

FOREIGN PATENT DOCUMENTS

WO  WO 0004106 A1 *  1/2000
WO  WO 2008/118950    10/2008

OTHER PUBLICATIONS

Alblas, B.P. et al., "The Effect of Chloride Contamination on the Corrosion of Steel Surfaces: A Literature Review," Jr. PCE (Feb. 1997) pp. 16-25.
Buchheit, R.G. et al., "Active corrosion protection and corrosion sensing in chromate-free organic coatings," Progress in Organic Coatings, vol. 47 (2003) pp. 174-182.
Khodakov et al., "Structure and Properties of Vanadium Oxide-Zirconia Catalysts for Propane Oxidative Dehydrogenation," Journal of Catalysis, vol. 177 (1998) pp. 343-351.
U.S. Appl. No. 12/054,985, filed Mar. 25, 2008, Boocock.
U.S. Appl. No. 12/211,390, filed Sep. 16, 2008, Boocock.
U.S. Appl. No. 60/908,197, filed Mar. 27, 2007, Boocock.
U.S. Appl. No. 60/973,858, filed Sep. 20, 2007, Boocock.
Morcillo, M., "Soluble salts: their effect on premature degradation of anticorrosive paints," Progress in Organic Coatings, vol. 36(3) (Jul. 1999) pp. 137-147.
Weller, M.T., "Where zeolites and oxides merge: semi-condensed tetrahedral frameworks," J. Chem. Soc., Dalton Trans. (2000) pp. 4227-4240.

* cited by examiner

*Primary Examiner* — Aaron Austin
(74) *Attorney, Agent, or Firm* — Frost Brown Todd LLC

(57) ABSTRACT

Sodalite is synthesized in the presence of a stoichiometric quantity of Permanganate ion. After thorough washing to remove trace salts the resulting pigment may be encapsulated with amorphous silica using the Iler process. The resulting pigment has enhanced acid stability and provides excellent corrosion protection on reactive metal substrates such as Aerospace Aluminum or Coil grade Hot-Dip Galvanized Steel.

10 Claims, No Drawings

NON-CHROMATE CORROSION INHIBITOR FORMULAS BASED ON PERMANGANATE SODALITE COMPOSITIONS

This application is based upon and claims priority from U.S. Provisional Patent Application No. 60/973,237, Boocock, filed Sep. 18, 2007, incorporated herein by reference.

FIELD OF THE INVENTION

The invention relates to corrosion inhibitive pigmentary compositions free of Chromium. More specifically these compositions are essentially free of hexavalent chromium {Cr(VI)}. The inventive compositions are useful in coatings applied as the primer component of a coating system intended to prevent corrosion of Aluminum (2024-T3) or Hot-Dip Galvanized or Zn—Al coated (Galvalume) coil stock.

BACKGROUND OF THE INVENTION

Chromium in the form of Chromate (CrO4—) is a widely employed and highly effective corrosion preventive pigment. It is the de facto standard for corrosion prevention in primers applied to aluminum, particularly aerospace aluminum stock (2024-T3, and certain 7000 series alloys for instance). In addition hexavalent chromate in the form of Strontium Chromate is the benchmark for corrosion prevention in coil coating primers (whether based on Epoxy-Melamine, Polyester or other binder systems) when applied to Zinc, Zinc-Aluminum or similar galvanized or electro-galvanized coil stock.

There has been extensive activity to eliminate hexavalent chromium from these primer systems, which efforts are driven by two related impeti. First, Hexavalent Chromium is toxic, thus efforts to identify a performance equal substitute to Strontium Chromate are easily understood. Secondly, there are directives promoted in Europe that require a limit on Chromium content, such that a manufactured article may more readily be recycled.

For the foregoing reasons there have been numerous academic research projects (Progress in Organic Coatings 47 (2003) 174-182—Buchheit et al.), and an untold number of industry product development exercises devoted to finding a replacement for Strontium Chromate. There is also a substantial patent literature history describing some of these efforts by industry.

In almost every case examined, however, there appears to be one or more flaws in the touted benefits of the inventive compounds. Typically, the claimed chromate-free inhibitor is in fact not demonstrated in a coating system, but rather in a primer alone. This may disguise a performance flaw, e.g., that the inhibitive pigment leads to blistering. Sometimes, the touted composition is offered based on data for a coating system that is applied only to ferrous metal surfaces. Though it may be free of chromium, the anti-corrosive pigment provides insufficient electrochemical over-potential to prevent corrosion of highly reactive metals such as Aluminum or Zinc.

Finally, it is often the case that the benefit of a chrome-free anti-corrosive pigment is made on the basis of unrealistically short accelerated testing, which is deemed unreliable by those skilled in the art. Indeed, many patented offerings, when independently tested, fail to deliver the long duration of outstanding corrosion prevention expected of Strontium Chromate in benchmark accelerated tests.

The present invention overcomes these deficiencies in previous chrome-free anti-corrosive pigments. It provides proof that the inventive compositions are able to deliver performance on a par with Strontium Chromate when evaluated directly alongside the same in realistic coating systems, appropriate for the substrate and end-use application. The present invention in one preferred form does use a ratio of elements in its composition that is previously disclosed, though in an entirely different field of application. It differs from the prior disclosed systems in that this ratio of elements is used to make a highly crystalline Alumino-Silicate which crystallizes in the Sodalite form, and contains as charge balancing interior anions Permanganate ($MnO_4^-$). This general composition of matter has been widely reported in peer-reviewed journals, and is typically represented by the following formula, $Na_8Al_6Si_6O_{24}(MnO_4)_{2-x}OH_x$ where x is from 0.1 to 0.9, and is typically 0.5. All reports on the synthesis of such Permanganate balanced Sodalite compositions have focused on the color properties of the finished pigment. None have looked at the utility of such pigments as anti-corrosive pigments. See Weller, J. Chem. Soc., Dalton Trans., 2000, 4227-4240.

The present invention affords finished compositions within the above ranges that are, by virtue of the synthetic method employed, essentially free of soluble salts. In addition, the disclosed compositions are made more suitable for use in anti-corrosive applications by adjustment of their acid stability through the employment of partial or complete silica encapsulation. Furthermore, due to the lack of trace salt contaminants, their resistance to blistering in typical coating systems is greatly improved.

BRIEF SUMMARY OF THE INVENTION

The present invention covers the chemistry, processes and means of application for an anti-corrosive pigment substantially free of hexavalent chromium. Said pigments may be used in direct substitution for Strontium Chromate in primers intended for zinc-coated or zinc-alloy coated coil stock. Said pigments may be used in direct substitution for Strontium Chromate in primers intended for Aluminum alloy surfaces. The chemistry involves the reaction of Sodium Aluminate and Sodium Silicate or Colloidal Silica with Sodium Hydroxide and Sodium Permanganate at 100-110° C. in a sealed container under autogenous pressure. The resulting intermediate product is washed free of unreacted salts, optionally treated with dilute Phosphoric Acid. This second intermediate product is then subjected to an Iler deposition process in which a protective sheath of amorphous silica is grown around the Sodalite crystals.

This preferred form of the invention affords a deeply purple colored pigment which is essentially free of extraneous soluble salts.

DETAILED DESCRIPTION OF THE INVENTION

In accordance with the foregoing summary, the following represents a detailed description of preferred embodiments of the present invention.

Example 1

The following ingredients are intensively mixed in a Teflon lined vessel: Sodium Aluminate, Colloidal Silica, Sodium Hydroxide, Sodium Permanganate and Water. The elemental ratio of Aluminum to Silicon to Manganese in the reaction batch is 6:6:2, the ratio of Sodium to Silica is between 8:6 and 10:6. The relative mass of solids to water is between 80:100 and 50:100. The vessel is closed tightly and the temperature of the reaction batch raised to 110° C., at which temperature it is held for no less than 24 hours, and typically no more than 72 hours.

After cooling, the crystalline product is recovered by filtration, then washed repeatedly to remove excess Sodium Hydroxide or unreacted Permanganate. The product can then be dried and milled to desired particle size using any common means of comminution.

Example 2

The product from Example 1 is slurried with water at a 40% w/w ratio. The pH of the slurry is monitored and 10% Phosphoric Acid is added drop-wise until the pH of the slurry stabilizes between 8.0 and 8.5. The slurry is then stirred for no less than one hour, following which the pigment is recovered by filtration. The product is repeatedly washed to remove trace salts, then dried to yield a deep purple free flowing solid.

Example 3

Pigments made in accordance with Examples 1 or 2 are slurried in water at an approximate weight ratio of 15-20% w/w. To the slurry is added Sodium Silicate (N-40 grade, PQ Corp) at a ratio of 15 parts (by weight) per 100 parts of pigment. The slurry is raised in temperature to between 80-100° C. with constant stirring. To the resulting slurry are co-added a 10% solution of Sulphuric Acid and a 10% Sodium Silicate solution over a period of 3 hours. The resulting slurry is maintained at 65-80° C. overnight. The purple pigment is recovered by filtration and repeatedly washed until free of sodium sulfate, dried and then comminuted to a fine particle size.

Example 4

Pigments made in accordance with Examples 1 through 3 are incorporated into coil primers in accordance with the formula in Table 1 As positive control, a Strontium Chromate pigmented primer is employed. As a negative control, a primer composition in which all anti-corrosive materials are substituted for inert pigments (TiO2 and Talc) is employed. Each primed surface is then top-coated with a compatible coil coating system as shown in Table 2. The relative edge undercutting and scribe undercutting performance of these systems after 1,000 Hours of Salt Fog Exposure is depicted in Table 4.

Example 5

Pigments made in accordance with Examples 1 through 4 were incorporated into a 2-pack Epoxy coating applied to Aluminum 2024-T3 panels. The general primer formula used is depicted in Table 3. As positive control, a Strontium Chromate pigmented primer is employed. As a negative control, a primer composition in which all anti-corrosive materials are substituted for by inert pigments (TiO2 and Talc) is employed. Each primed surface is then top-coated with a compatible Epoxy topcoat. The relative edge undercutting and scribe undercutting performance of these systems after 1,000 to 3,000 Hours of Salt Fog Exposure is depicted in Table 5.

TABLE 1

Coil Coating Primer System

| Positive Control Component | Wt | Solids | |
|---|---|---|---|
| Dynapol LH820-04 | 50 | 0.5 | 25 |
| CaboSil M-5 | 0.4 | 1 | 0.4 |
| Filler-Talc | 4 | 1 | 4 |
| Tiona 696 | 8 | 1 | 8 |
| SrCrO4 | 6.2 | 0.65 | 4.03 |
| MPA | 7.6 | 0 | 0 |
| Make Grind in Eiger Mill to Hegman of 7 | | | |
| Epikote 1004 | 6 | 0.5 | 3 |
| Vestanat EP-B 1481 | 6 | 0.65 | 3.9 |
| Dabco T12N | 1 | 0.1 | 0.1 |
| Nacure 1953 (5% in IPA) | 2 | 0.05 | 0.1 |
| Cymel 303 (80% in IPA) | 2.5 | 1 | 2.5 |

TABLE 1-continued

| Byk 355 (20% in Naptha) | 3 | 0.1 | 0.3 |
|---|---|---|---|
| Naptha 150 | 3.3 | 0 | 0 |
| | 100 | 6.55 | 51.33 |

Let Down on Cowles with the above components

Samples using examples of the inventive pigments from Examples 1 and 2 are made by substitution of Strontium Chromate on a weight-to-weight basis. To maintain the ratio of Critical Pigment Volume to Pigment Volume Concentration within the bounds defined by the above formula adjustments are also made in the loading of Talc or TiO2 (Kronos 2059) in the above formula.

Primer films are drawn down on Hot-Dip Galvanized or Galvalume Panels, to which a Henkel 1421 pretreatment has been applied, at 7-microns target DFT using a wire-wound rod. The films are cured for 35-40 seconds with an oven temperature of 343° C. to achieve a Peak Metal Temperature of 225° C.

TABLE 2

Polyester Topcoat Formula

| Grind | CL | Grams |
|---|---|---|
| Kronos 2310 | 5706 | 650 |
| Bayferox M130 | | 65 |
| Dynapol LH530-02 | 4376 | 321.75 |
| Solvesso 200 | 4533 | 125.6 |

| Letdown Base | Grams | Solids |
|---|---|---|
| Dynapol LH530-02 | 300 | 60% |
| Cymel 303 | 105 | 99% |
| Solvesso 200 | 150 | 0% |
| BYK 392 | 10 | 50% |
| | 565 | |

| | Grams |
|---|---|
| Grind | 31.0 |
| Letdown Base | 36.0 |

Hegman 5-6
Eiger milled continuously at 3500 rpm using 1.0-1.2 SEPR beads.
30wwr, 50 sec cure at 343°

TABLE 3

2-Component Epoxy Primer Formula

| Material | Part A | |
|---|---|---|
| Epon 828 | 157.95 | 17.02 |
| Heloxy Modifier 8 | 30.01 | 3.23 |
| Suspeno 201-NBA | 5.48 | 0.59 |
| Nicron Talc 503 | 43.63 | 4.70 |
| N-Butyl Acetate | 322.30 | 34.73 |
| Gasil 23F Silica Gel | 27.05 | 2.91 |
| Kronos 2310 | 21.16 | 2.28 |
| Pigment | 300.50 | 32.38 |
| Disperbyk 111 | 20.000 | 2.15 |
| Grind Above to Hegman of 5-6 | | |

| Material Part B | Part B | |
|---|---|---|
| Epikure 3155 HY283 | 711.03 | 86.28% |
| Tertiary Amine K54 | 55.22 | 6.70% |
| NBA | 57.85 | 7.02% |

Mix Part A and B in a ratio of 5:1 by weight
Apply by wire-wound rod to target DFT of 1.0-1.5 mils The above generic formula is used for the generation of all primer samples including Strontium Chromate, Examples 1 and 2 above, and a negative control wherein all the Strontium Chromate is substituted for by Tiona 696 TiO2. This same negative control version is also used as the topcoat for all samples.

TABLE 4

Edge Undercutting LH820 Polyester Coil Coatings on Henkel 1421 treated Hot-dip galvanized coil stock

| Name | Example | 101 h | 147 h | 218 h | 334 h | 406 | 482 h | 1016 h |
|---|---|---|---|---|---|---|---|---|
| 144-A | 3 | 0 | 0 | 0 | 1 | 2 | 2 | 2 |
| 144-B | 3 | 0 | 0 | 0 | 1 | 2 | 2 | 2 |
| 140-1 A1 | | 0 | 0 | 0 | 1 | 1 | 3 | 8 |
| 140-1 A2 | | 0 | 2 | 2 | 7 | >10 | >10 | 9 |
| 140-2 A1 | | 0 | 0 | 1 | 3 | 6 | 6 | 30 |
| 140-2 A2 | | 0 | 2 | 2 | 3 | 4 | 5 | 10 |
| 140-3 A1 | | 0 | 0 | 1 | 2 | 3 | 4 | 13 |
| 140-3 A2 | | 0 | 0 | 2 | 3 | 5 | 9 | 14 |
| 140-4 A1 | | 0 | 2 | 3 | 5 | 6 | 7 | 9 |
| 140-4 A2 | | 0 | 0 | 3 | 9 | 8 | 8 | 10 |
| 140-5 A1 | | 0 | 1 | 3 | 8 | 6 | 7 | 6 |
| 140-5 A2 | | 0 | 0 | 0 | 3 | 4 | 8 | 7 |
| 140-6 A1 | | 0 | 0 | 0 | 2 | 2 | 6 | 8 |
| 140-6 A2 | | 0 | 1 | 1 | 2 | 3 | 6 | 10 |
| 140-7 A1 | | 0 | 1 | 2 | 2 | 3 | 3 | 8 |
| 140-7 A2 | | 0 | 2 | 2 | 7 | 8 | 10 | 9 |

The trials 140-1 through 140-7 are commercial anti-corrosive pigments.

140-1 is Strontium Chromate. 140-2 uses an equal weight of Halox 400 in place of Strontium Chromate (i.e., 100% Halox 400). 140-3 uses an equal weight of the following mixture Halox 400 (95%) and Halox 650 (5%) in place of Strontium Chromate. 140-4 uses Heucophos SAPP pigment as a 1:1 substitute for Strontium Chromate (i.e., 100% Heucophos SAPP). 140-5 uses Heucophos SRPP in place of Strontium Chromate 1:1 by weight (i.e., 100% Heucophos SRPP). 140-6 uses an equal weight of the following mixture in place of Strontium Chromate, Heucorin RZ (5%) Heucophos SAPP (95%). 140-7 uses an equal weight of the following mixture in place of Strontium Chromate, Heucorin RZ (5%) Heucophos SRPP (95%).

What is claimed is:

1. A method of providing protection to a surface against corrosion by applying to said surface an effective amount of a crystalline Sodalite-Permanganate material which is substantially free of trace salts.

2. A method according to claim 1 wherein, in the material, the ratio of elements is $Na_8Al_6Si_6O_{24}(MnO_4)_{2-x}OH_x$ where "x" can be between 0.1 and 0.9.

3. A method according to claim 2 wherein x=0.5.

4. A crystalline sodalite-permanganate material having the ratio of elements $Na_8Al_6Si_6O_{24}(MnO_4)_{2-x}OH_x$ where "x" is between 0.1 and 0.9, which is substantially free of trace salts, the acid stability of which is enhanced through the deposition onto the material of an amorphous silica coating.

5. A coated metal composition comprising a Zinc or Zinc-Aluminum alloy coated coil stock having deposited thereon a primer composition comprising a primer material and a crystalline sodalite-permanganate material having the ratio of elements $Na_8Al_6Si_6O_{24}(MnO_4)_{2-x}OH_x$ where "x" is between 0.1 and 0.9, which is substantially free of trace salts.

6. A coated metal composition comprising an aerospace grade aluminum alloy, top-coated with a color coat, and having deposited thereon an epoxy primer composition comprising a primer material and a crystalline sodalite-permanganate material having the ratio of elements $Na_8Al_6Si_6O_{24}(MnO_4)_{2-x}OH_x$ where "x" is between 0.1 and 0.9, which is substantially free of trace salts.

7. A method of providing protection to a surface against corrosion by applying to said surface an effective amount of a primer composition comprising a primer material and a crystalline sodalite-permanganate material which is substantially free of trace salts.

8. A method according to claim 7 wherein the primer material is an epoxy primer.

9. A crystalline sodalite-permanganate material, substantially free of trace salts, which is treated with dilute phosphoric acid.

10. The material of claim 9 which additionally includes an amorphous silica coating.

* * * * *